Nov. 7, 1933  S. HERMANSON ET AL  1,934,064
LINING OF HIGH PRESSURE TUBULAR ARTICLES
Filed Oct. 5, 1931
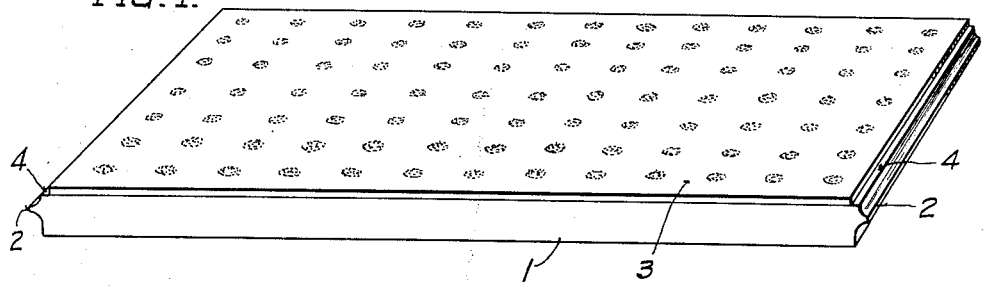
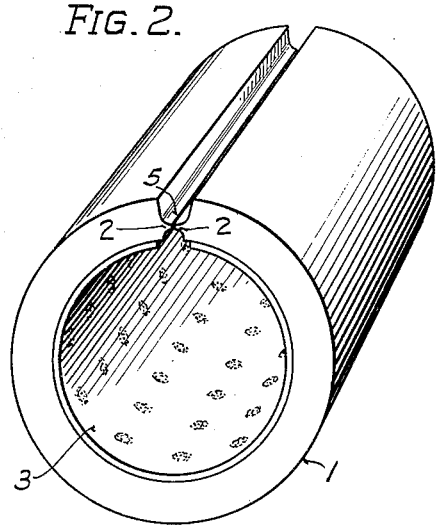
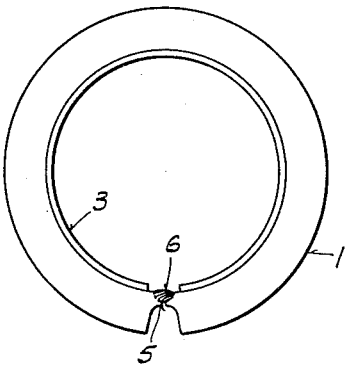
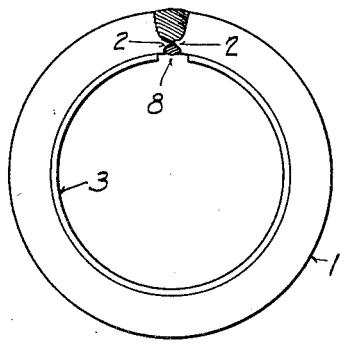
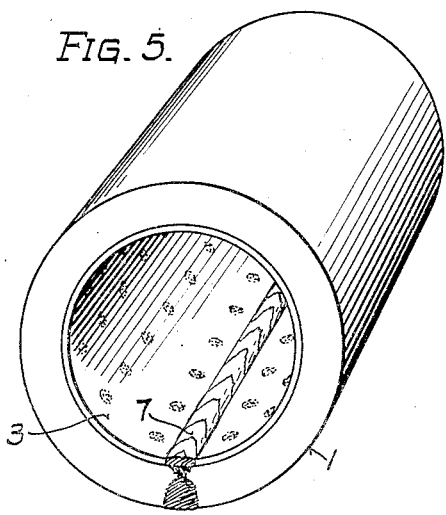
INVENTORS:
Sune Hermanson
Orrin E. Andrus
BY
ATTORNEY.

Patented Nov. 7, 1933

1,934,064

UNITED STATES PATENT OFFICE 1,934,064

LINING OF HIGH PRESSURE TUBULAR ARTICLES

Sune Hermanson, Milwaukee, and Orrin E. Andrus, Wauwatosa, Wis., assignors to A. O. Smith Corporation, Milwaukee, Wis., a corporation of New York Application October 5, 1931. Serial No. 567,112

4 Claims. (Cl. 219—10)

The present invention relates to lined high pressure tubular articles and the method of making them.

An object of the invention is to provide for fabricating lined high pressure tubular articles.

A more specific object of the invention is to provide high pressure tubular articles free from internal stresses and capable of resisting contained corrosive agents.

Another object is to provide a more suitable and efficient method of arc welding a composite article such as a seam in a heavy walled high pressure vessel having a corrosion resistant alloy lining.

In the drawing:

Figure 1 is a perspective view of a blank prepared for forming into a tubular article;

Fig. 2 is a perspective view showing the blank rolled into a cylinder with its meeting edges ready for welding;

Fig. 3 is an end view of the tube after the first welding step has been completed;

Fig. 4 is a view similar to Fig. 3 showing the plate completely welded; and

Fig. 5 is a perspective view showing the finished article.

In the oil refining and chemical industries, the trend is toward higher pressure and temperatures, making possible processes which hitherto have not been attempted. To the manufacturer of high pressure vessels used in these industries, the higher pressures and temperatures, means that his products will have to be proportionately stronger and capable of resisting the attacks of corrosive fluids. This is particularly the case in the cracking of crude oils with relatively high sulphur content.

The high temperatures which are produced in oil cracking are conducive to rapid corrosion while the high pressures make it imperative that the vessels are not only safe when delivered, but safe after long periods of continued use. Out of this demand has grown the corrosion resistant lining for pressure vessels consisting of a metal sheet of chromium alloy and similar metals firmly secured to the surface of the vessel subjected to the corrosive agencies.

The use of two metals of different characteristics give rise to manufacturing problems which in the past have somewhat dampened the enthusiasm of the manufacturer because of the technical difficulties. For instance, the metals may have unlike coefficients of expansion and the subjection of the vessel to high temperatures may cause the liner to fail because its support is withdrawn.

The present invention solves these difficulties by a series of operations in the manufacture of the vessel or tubular connector which produces a vessel free from residual manufacturing stresses and which remains relatively free from the defects shown to have existed in the vessels first constructed.

A flat plate 1 of ferrous metal, which is to be rolled to make the tubular article, is chamfered at the edges to provide lips or tongues 2 running longitudinally of the edges to be welded during fabrication. While the location of the lip 2 may vary with respect to the top and bottom of the plate, it has been found desirable to have the lip spaced from the inner surface approximately one-third of the thickness of the plate.

A relatively thin sheet of corrosion resisting metal 3 such as chromium alloy is welded to the plate 1 before it is rolled. The welding is accomplished by electrical resistance spot welding at frequent intervals so that the sheet 3 is firmly bonded to the plate 1. The dimensions of the sheet 3 are such that when placed upon the plate 1, there will be an inner margin 4 at each end, corresponding to the welded edge, which is not covered with corrosion resisting metal, as shown in Fig. 1.

In fabricating an article after the sheet has been bonded to the plate, the composite structure is rolled into a cylinder, as shown in Fig. 2, with the tongues 2 meeting and in accurate alignment. The lips 2 form a welding dam 5 at the bottom of the grooves formed when the chamfered plate is rolled to make a cylinder as shown in Fig. 2. The lower portion of the seam is thereupon welded by a deposit of weld metal 6 corresponding to the material of the base plate 1 projected into the welding groove by means of an electric arc. The thin lip 5 prevents the escape of welding metal from the groove and acts as a chill to solidify the metal as it is deposited. The vessel is then rotated to a position where the unwelded groove faces upwardly, thus forming a trough for the weld metal deposited in the seam.

The initial pass of the welding arc along the seam, as shown in Fig. 4, burns through the lips 2 and forms an integral bond between the metal of the base plate 1, the metal deposited from the inner surface of the vessel, and that deposited from the outside. The resulting seam then is one which is free from blow holes or insufficient penetration to secure maximum efficiency in the weld. If the vessel were left in the form shown in Fig. 4, the liner would be a protection to the entire vessel wall except at the seam. Since the seam must also be protected, this is accomplished by making a deposit of corrosion resisting metal 7 using a weldrod of ascaloy or other chromium alloys and filling the gap 8 left during initial steps of the fabrication between the ends of the liner sheet 3. The cylindrical article thus welded in steps is free from residual stresses caused by overheating during welding.

The successive operations of welding from opposite sides of the plates and in a number of passes of the weldrod along the seam, tends to minimize welding stresses and produce an article inherently strong and capable of withstanding both high pressures and high temperatures. The liner is closely united and secured to the vessel wall and is welded at its seam with metal of like characteristics to produce an unbroken interior of corrosion resisting metal. The completed structure than meets the requirements placed upon it by the industries and processes therein now coming into being.

By reason of the receding of the edge of the alloy liner sheet from the main edge of the plate, the opposed edges of the lining sheet being spaced apart farther than the respective edges of the plate, the latter is welded without danger of injury to or contamination of the alloy sheet. Since with certain alloys, such as chromium steels, it is difficult to keep from burning the metal when adjacent the welding arc, the present invention provides for the maintaining of a proper edge on the liner sheet for subsequent fusion with the alloy deposit 7.

While the specific steps set forth in the above description will produce the article hereinafter claimed, it will be understood that various departures may be made from the above process without departing from the spirit and scope of the appended claims.

We claim:

1. The method of welding a seam in a composite article having a plate and a corrosion resistant alloy sheet at one side thereof, comprising providing a welding groove between the meeting edges of the plate or plates at the seam with the edges of the alloy sheet lining set back from the main edge portion of the plate to protect the sheet from injury during the welding of the plate edges, depositing fusing weld metal in the groove to weld the plate edges together, and thereafter depositing alloy weld metal of substantially the same nature as said sheet between the edges of the sheet and fused therewith to provide a continuous corrosion resistant alloy surface for the article.

2. A method of welding a seam in a composite article having a plate and a corrosion resistant alloy sheet at one side thereof, comprising providing a welding groove between the opposed plate edges at the seam with the edges of the alloy sheet lining spaced apart a greater distance than the edges of the plate to protect the sheet from injury during the welding of the plate, depositing welding metal in the groove to weld the plate edges together by means of an electric arc, and thereafter depositing alloy weld metal of the same nature as said sheet between the edges of the sheet and fused therewith and with the weld metal previously deposited in the groove to provide a continuous corrosion resistant alloy surface for the article.

3. The method of making pressure cylinders for fabricating pressure vessels, which comprises chamfering the edges of a thick metal plate to provide a scarf for welding, attaching a corrosion resistant alloy lining sheet to one side of the plate with the edges of the sheet set back from the edges of the plate, forming the composite plate and sheet into a cylinder with the lining sheet on the inside and with the scarfed plate edges meeting to provide a grooved seam for welding and with the opposed edges of the lining sheet spaced apart a greater distance than the plate edges, welding the plate edges together with fusing weld metal deposited in the groove, and welding the edges of the alloy sheet together by depositing alloy weld metal therebetween to provide a continuous corrosion resistant lining over the welded seam.

4. The method of making pressure cylinders for fabricating pressure vessels, which comprises chamfering the edges of a thick metal plate to provide a scarf for welding, arranging a corrosion resistant alloy lining sheet on one side of the plate with the edges of the sheet set back from the edges of the plate, electric resistance spot welding the sheet to the plate at intervals to form a composite structure, forming the composite structure into a cylinder with the lining sheet on the inside and with the chamfered plate edges meeting to provide a scarfed seam for welding, applying an electric arc and depositing weld metal in the scarf to weld the plate edges together, and thereafter applying an electric arc to deposit corrosion resistant alloy metal between the spaced edges of the liner sheet and over the surface of the welded seam of the plate edges.

SUNE HERMANSON.
ORRIN E. ANDRUS.